(12) United States Patent
Juliussen et al.

(10) Patent No.: US 12,163,009 B2
(45) Date of Patent: Dec. 10, 2024

(54) REINFORCED BIODEGRADABLE POLYMER NANOCOMPOSITE AND METHOD OF MANUFACTURE THEREOF

(71) Applicant: Toraphene Limited, London (GB)

(72) Inventors: Gaute Juliussen, London (GB); Simon Broughton, London (GB)

( * ) Notice: Subject to any disclaimer, the term of this patent is extended or adjusted under 35 U.S.C. 154(b) by 104 days.

(21) Appl. No.: 17/777,013

(22) PCT Filed: Nov. 16, 2020

(86) PCT No.: PCT/IB2020/060747
§ 371 (c)(1),
(2) Date: May 13, 2022

(87) PCT Pub. No.: WO2021/095023
PCT Pub. Date: May 20, 2021

(65) Prior Publication Data
US 2022/0396686 A1    Dec. 15, 2022

(30) Foreign Application Priority Data

Nov. 15, 2019 (GB) .................................. 1916694

(51) Int. Cl.
*C08K 9/04* (2006.01)
*C08J 3/21* (2006.01)
*C09C 1/44* (2006.01)
*C09C 3/08* (2006.01)

(52) U.S. Cl.
CPC ............... *C08K 9/04* (2013.01); *C08J 3/212* (2013.01); *C09C 1/44* (2013.01); *C09C 3/08* (2013.01); *C08J 2325/06* (2013.01); *C08J 2333/04* (2013.01); *C08K 2201/011* (2013.01)

(58) Field of Classification Search
CPC .. C08K 9/04; C08K 3/042; C08J 3/212; C08J 2325/06; C08J 2333/04; C08J 2201/011; Y02W 90/10; C08L 2666/55; C08L 2666/54; C08L 2201/06; B82Y 30/00; C09C 1/44; C09C 3/08
USPC ....................................................... 523/205
See application file for complete search history.

(56) References Cited

U.S. PATENT DOCUMENTS

| | | | | |
|---|---|---|---|---|
| 2013/0320274 | A1* | 12/2013 | Walters | C09C 1/44 252/511 |
| 2015/0014577 | A1 | 1/2015 | Chowdhury et al. | |
| 2016/0276056 | A1 | 9/2016 | Stolyarov et al. | |
| 2018/0044532 | A1 | 2/2018 | Christiansen et al. | |

FOREIGN PATENT DOCUMENTS

| | | |
|---|---|---|
| WO | 2016025051 A2 | 2/2016 |
| WO | 2021095023 A1 | 5/2021 |

OTHER PUBLICATIONS

Examination Report under Section 18(3) issued for United Kingdom Patent Application GB1916694.1, on Feb. 20, 2023, 5 Pages.
Xu et al., published "Graphene-Like Two-Dimensional Materials" in Chemical Reviews, vol. 113, No. 5, on Jan. 3, 2013, p. 3766-3798.
Baruah et al., published "Bio-based tough hyperbranched epoxy/ graphene oxide nanocomposite with enhanced biodegradability attribute" in Polymer Degradation and Stability, on Mar. 20, 2016, p. 26-33.
Pinto et al., published "Effect of biodegradation on thermo-mechanical properties and biocompatibility of poly(lactic acid)/ graphene nanoplatelets composites" in European Polymer Journal, vol. 85, 2016, on Oct. 27, 2016, p. 431-444.
Larsson et al., published "Effect of hydrophobically modified graphene oxide on the properties of poly(3-hydroxybutyrateco-4-hydroxybutyrate )" in Polymer, vol. 108, 2017, on Nov. 19, 2016, p. 66-77.
Anastasios et al., published "Molecular Functionalization of Two-Dimensional MoS2 Nanosheets" in Chemistry A European Journal, vol. 24, No. 69, on Dec. 10, 2018, p. 18246-18257.
Zhang et al., published "Effects of ultrasonication duration and graphene oxide and nano-zinc oxide contents on the properties of polyvinyl alcohol nanocomposites" in Ultrasonics-Sonochemistry, vol. 59, 2019, on May 24, 2019, 15 pages.
Cobos et al., published "One-step eco-friendly synthesized silver-graphene oxide/poly(vinyl alcohol) antibacterial nanocomposites" in Carbon, vol. 150, 2019, on May 24, 2019, p. 101-116.

(Continued)

Primary Examiner — Hannah J Pak
(74) Attorney, Agent, or Firm — RC Trademark Company

(57) ABSTRACT

Disclosed is a reinforced biodegradable polymer nanocomposite. The reinforced biodegradable polymer nanocomposite comprises a polymer matrix and functionalised graphene nanoplatelets or graphene-like material dispersed in the polymer matrix. The graphene nanoplatelets or graphene-like material are functionalized with functional groups in a manner that planar structure of the graphene nanoplatelets or graphene-like material is retained. Disclosed further is a method of manufacturing the aforementioned reinforced biodegradable polymer nanocomposite. The method comprises functionalizing graphene nanoplatelets or graphene-like material with functional groups in a manner that planar structure of the graphene nanoplatelets or graphene-like material is retained; and dispersing functionalized graphene nanoplatelets or graphene-like material in the polymer matrix to form the reinforced biodegradable polymer nanocomposite.

4 Claims, No Drawings

(56) References Cited

OTHER PUBLICATIONS

Combined Search and Examination Report under sections 17 and 18(3) issued in GB Application No. GB1916694.1 on Feb. 26, 2020, 8 pages.
International Search Report with Written Opinion issued in International Patent Application No. PCT/IB2020/060747 on Mar. 17, 2021, 12 pages.

* cited by examiner

REINFORCED BIODEGRADABLE POLYMER NANOCOMPOSITE AND METHOD OF MANUFACTURE THEREOF

TECHNICAL FIELD

The present disclosure relates generally to packaging material, and more specifically to a reinforced biodegradable polymer nanocomposite comprising a polymer matrix and functionalised graphene nanoplatelets or graphene-like material dispersed therein. Moreover, the present disclosure is concerned with a method of manufacturing the aforementioned reinforced biodegradable polymer nanocomposite.

BACKGROUND

Globally, plastic is indispensably used for convenient storage and transportation of a product. However, recently, ordinary plastic waste is one of the biggest problems in the world due to its non-degradable nature. Therefore, plastic waste often ends up as litter and is dumped in landfills and/or water bodies. Such disposal of plastic waste has severe environmental consequences. For instance, plastics dumped in water bodies, such as rivers and oceans, affect the nutrient uptake of the aquatic animals dwelling therein, and indeed causes more serious harm to aquatic animals. Furthermore, plastic waste, among other hazardous chemical and non-biodegradable wastes, has not only been destroying the environment but also toxifying the human food chain.

With an increasing focus on eco-friendly materials and environment concerns, techniques have been developed to manufacture degradable and/or recyclable packaging materials. In recent times, various grades of biodegradable plastics have been developed that have found use in niche applications, such as shopping bags. Such biodegradable plastics disintegrate under certain conditions over a period of time. However, compared to ordinary plastics, such biodegradable materials are often mechanically weak, brittle, and of low impact- and fatigue resistance. Moreover, they have poor heat- and ultraviolet light resistance, and make poor barriers to gases, liquids and odour (i.e. flavour or aroma).

In order to enhance the abovementioned properties of biodegradable plastics, particularly in high growth markets, multiple materials (or additives) are added to impart the desired barrier and mechanical properties. However, current methods of making biodegradable plastics have many limitations in terms of cost, efficiency, and quality. For example, additives, such as mica, microfibres (for example carbon fibre, fibre glass, Kevlar, and so forth), and chemical modifiers (for example Arkema's Biostrength 280 Acrylic core-shell impact modifier) are expensive and are associated with undesired effects like toxicity, reduced degradation rates, rheological and processing problems and brittleness. Furthermore, multiple materials in plastics render the plastics incompatible with the current recycling schemes and subsequently contribute to untreated dumping in landfills and/or water bodies. More often than not, the plastics disintegrate into nano- or microplastic particles that do not degrade and get accumulated to threaten the world's ocean life and human food chain.

Recent advances in nanotechnology and plastic industry have introduced nano- to microscopic level additives, such as graphene (in particular graphene oxide flakes), to impart mechanical strength to the plastics. Graphene is normally hydrophobic and impermeable to gases and liquids. However, graphene available as graphene oxide is hydrophilic and is permeable to gases and liquids. Moreover, the solubility of graphene is further enhanced through chemical modification of graphene oxide, referred to as functionalization. Current methods of preparing functionalized graphene sheets have many limitations in terms of efficiency, cost and quality. Moreover, functionalized graphene manufactured from conventional methods has many defects in the structure and properties of graphene thereby defeating the purpose of graphene in plastics. Furthermore, the dispersibility of functionalized graphene sheets in dispersion media and conductivity is limited.

Therefore, in light of the foregoing discussion, there exists a need to overcome the aforementioned drawbacks associated with conventional packaging materials and methods of manufacture thereof.

SUMMARY

The present disclosure seeks to provide a reinforced biodegradable polymer matrix. The present disclosure also seeks to provide a method of manufacturing the aforementioned reinforced biodegradable polymer matrix. The present disclosure seeks to provide a solution to the existing problem of mechanically weak biodegradable plastics and less sustainable lifecycle of such plastics. The present disclosure further seeks to provide a mechanically strong and eco-friendly biodegradable plastic material.

In one aspect, an embodiment of the present disclosure provides a reinforced biodegradable polymer matrix comprising a polymer matrix and functionalised graphene nanoplatelets or graphene-like material dispersed in the polymer matrix, wherein the graphene nanoplatelets or graphene-like material are functionalized with functional groups attached at edges of the sheets.

An aim of the present disclosure is to provide a solution that overcomes at least partially the problems encountered in prior art, and to provide a novel, cheap and highly efficient process to manufacture improved and reliable plastics that are recyclable, degradable, durable, sustainable, lightweight; moreover, employs edge functionalising graphene nanoplatelets or graphene-like material while still preserving the superior properties of graphene nanoplatelets or graphene-like material as a two-dimensional structure with minimal defects within the crystal lattice structure.

Optionally, the functionalised graphene nanoplatelets or graphene-like material include graphene or a material selected from a group comprising functionalized graphene, doped graphene, graphene oxide, partially reduced graphene oxide, graphite flakes, molybdenum disulfide ($MoS_2$), molybdenum diselenide ($MoSe_2$), molybdenum ditelluride ($MoTe_2$), tungsten disulfide ($WS_2$), tungsten diselenide ($WSe_2$), hexagonal boron nitride (h-BN), gallium sulfide (GaS), gallium selenide (GaSe), lanthanum cuprate ($La_2CuO_4$), bismuth tritelluride ($Bi_2Te_3$), bismuth triselenide ($Bi_2Se_3$), antimony triselenide ($Sb_2Se_3$), zinc oxide (ZnO), niobium disulfide ($NbS_2$), niobium diselenide ($NbSe_2$), tantalum disulfide ($TaS_2$), vanadium disulfide ($VS_2$), rhenium disulfide ($ReS_2$), rhenium diselenide ($ReSe_2$), titanium disulfide ($TS_2$), titanium diselenide ($TSe_2$), indium trisulfide (InSs), zirconium disulfide ($ZrS_2$), zirconium diselenide ($ZrS_2$), cadmium selenide (CdSe).

Optionally, the graphene nanoplatelets or graphene-like material are functionalized with functional groups selected from the group comprising alkyl amines, aromatic amines, functionalized amines, alkyl alcohols, other nucleophilic entities, and combinations thereof.

Optionally, the polymer matrix comprises styrenic, acrylic or vinylic polymer.

Optionally, the graphene nanoplatelets or graphene-like material comprises functionable oxygen groups in a range of 0 to 10 percent by weight, wherein the graphene nanoplatelets or graphene-like material are functionalised using the functionable oxygen groups.

Optionally, the polymer matrix is functionalized.

In another aspect, an embodiment of the present disclosure provides a method of manufacturing a reinforced biodegradable polymer nanocomposite, the reinforced biodegradable polymer nanocomposite comprising:

a polymer matrix; and functionalized graphene nanoplatelets or graphene-like material dispersed in the polymer matrix, wherein the method comprises:
  a) activating edge sites on molecular sheets of the graphene nanoplatelets or graphene-like material;
  b) functionalizing the graphene nanoplatelets or graphene-like material with functional groups; and
  c) dispersing the functionalized graphene nanoplatelets or graphene-like material in the polymer matrix to form the reinforced biodegradable polymer nanocomposite.

Optionally, in the method of manufacturing a reinforced biodegradable polymer nanocomposite, the activating is carried out by contacting the graphene nanoplatelets or graphene-like material with a reagent selected from the group: thionyl chloride, Benzotriazol-1-yloxy-tris[dimethylamino]phosphonium hexafluorophosphate (BOP), 3-diethyoxyphosphoryloxy-1,2,3-benzotriazin-4(3H)-one (DEPBT), N,N'-Dicyclohexylcarbodiimide, N,N'-Diisopropylcarbodiimide, 4-(4,6-dimethoxy-1,3,5-triazin-2-yl)-4-methylmorpholinium chloride (DMTMM), 1-[bis(dimethylamino)methylene]-1H-1,2,3-triazolo[4,5-b]pyridinium-3-oxide (HATU), 2-(1H-benzotriazol-1-yl)-1,1,3,3-tetramethyluronium hexafluorophosphate (HBTU), 1H-(6-chlorobenzotriazol-1-yl)-1,1,3,3-tetramethyluronium hexafluorophosphate (HCTU), 1-Hydroxy-7-azabenzotriazole, Hydroxybenzotriazole, (7-azabenzotriazol-1-yloxy)tripyrrolidinophosphonium hexafluorophosphate (PyAOP) reagent, (benzotriazol-1-yloxy)tripyrrolidinophosphonium hexafluorophosphate (PyBOP) and Thiocarbonyldiimidazole.

Optionally, in the method of manufacturing a reinforced biodegradable polymer nanocomposite, the graphene nanoplatelets or graphene-like material (which to avoid misunderstanding is used as the raw material to be activated and functionalized) comprises a low amount, in particular, less than 10% oxygen atoms with respect to carbon atoms, of functionable oxygen atoms.

Optionally, the low amount of functionable oxygen atoms comprises 5% by less oxygen atoms with respect to carbon atoms.

Optionally, in the method of manufacturing a reinforced biodegradable polymer nanocomposite, the graphene nanoplatelets or graphene-like material are functionalized with functional groups selected from the group comprising alkyl amines, aromatic amines, functionalized amines, alkanols, other nucleophilic entities, and combinations thereof.

Optionally, functionalizing graphene nanoplatelets or graphene-like material with functional groups comprises treating virgin graphene nanoplatelets or graphene-like material with the functional group, optionally in the presence of an activating agent for a pre-determined time period at a pre-determined temperature; filtering the treated virgin graphene nanoplatelets or graphene-like material; and treating the filtered graphene nanoplatelets or graphene-like material with a nucleophilic agent.

The resulting functionalized graphene nanoplatelets or graphene-like material has edge functional groups, whereas conventional functionalized graphene has central functional groups attached to the faces of the graphene sheets, which may interfere with the planar structure of the graphene sheets.

Embodiments of the present disclosure substantially eliminate or at least partially address the aforementioned problems in the prior art, and provides a reinforced biodegradable polymer nanocomposite with improved mechanical performance (both strength and toughness) combined with superior barrier (water and oxygen barrier) properties, thermal and electrical conductivity, resistance to thermal degradation, and optical properties.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

The present disclosure provides the aforementioned reinforced biodegradable polymer nanocomposite with improved mechanical performance (both strength and toughness). The disclosed reinforced biodegradable polymer nanocomposite is highly efficient as a packaging material with a high sustainable product lifecycle combined with superior water and oxygen barrier properties. Moreover, the disclosed reinforced biodegradable polymer nanocomposite preserves the properties of graphene nanoplatelets or graphene-like material as a two-dimensional (referred to as '2D' hereafter) sheet with minimal defects within the crystal lattice structure. Beneficially, the functionalization of graphene is limited to edge functionalization, thereby improving the dispersibility of the graphene nanoplatelets or graphene-like material in the polymer matrix. Additionally, the aforementioned reinforced biodegradable polymer nanocomposite provides an environment-friendly alternative to conventional plastics, and may be exploited in niche applications employing recyclable or biodegradable materials.

The present disclosure provides the reinforced biodegradable polymer nanocomposite. Throughout the present disclosure, the term "reinforced biodegradable polymer nanocomposite" refers to an artificially-made material providing barrier properties. Herein, barrier properties refer to an ability of the material to prevent any of: (a) movement of substances on a given side to the other side of the material; and/or (b) access to substances on a given side from the other side of the material; and/or (c) UV light penetrating through the material and negatively impacting or degrading the substance on the other side. Notably, the reinforced biodegradable polymer nanocomposite can be employed for a variety of applications such as the manufacture of packaging products such as films, containers; coating of products such as helmets, protective gear; plastic bags; or developing three-dimensional structures. Throughout the present disclosure, the term "biodegradable" refers to a property of a material, such as a polymer nanocomposite, to decompose naturally in nature without causing environmental hazards. The decomposition occurs in a finite duration of time (for example, 1 year). Such biodegradable materials are used in various applications, such as manufacturing disposable containers such as plates, cups and bowl, carry bags, bottles and so forth. Optionally, the biodegradable material is at least one of: paper, cellulose, wood, cotton, coconut or rice husk, biodegradable plastic. For example, the paper coated with the reinforced biodegradable polymer nanocomposite may be used as the disposable container to store water.

The reinforced biodegradable polymer nanocomposite comprises a polymer matrix. Throughout the present disclosure, the term "polymer matrix" refers to a synthetic, polymeric, viscous compound (composition or substance) that provides the external or continuous (bulk) phase of dispersion, namely dispersion media. Dispersion media may be liquids, solids, and so forth. Liquid dispersion media may be solvents, mixtures of solvents, any other substance, composition, compound, and so forth, which exhibits liquid properties at room or elevated temperatures. Solid dispersion media may be one or more of: polymers (such as a solid or melted polymer, namely polymer melt); glasses; metals; metal oxides; and so forth.

In an embodiment, the polymer matrix may comprise a styrenic, acrylic or vinylic polymer, in other words, the polymer matrix may comprise chemicals having structural elements based respectively on styrene, an acrylic moiety or a vinyl moiety. The styrenic monomer may be styrene. The acrylic monomer may be an acrylic acid ester, e.g. methyl acrylate, or an alkylacrylic acid ester, e.g. methyl methacrylate, or may have another group, e.g. ethylene glycol, ethylene oxide bi-substituted with acrylic groups to participate in the polymerization. The vinylic monomer may be ethylene, propylene or substituted ethylene or propylene. The polymer matrix may comprise oligomers of the styrenic, acrylic or vinylic monomers. Suitable polymers for use as polymer matrix includes, for example, one or more of: acrylate or methylmethacrylate polymers or copolymers, such as polyacrylates, polymethylmethacrylates, polylactic acid (PLA) polymers, polyhydroxyalkanoate (PHA) polymers (e.g., polyhydroxybutyrate (PHB)), polycaprolactone (PCL) polymers, polyglycolic acid polymers, acrylonitrile-butadiene-styrene polymers (ABS), polyvinylidene fluoride polymers, polyurethane polymers, polyolefin polymers (e.g., polyethylene, polypropylene, and the like), polyester polymers, polyamide polymers, and so forth.

Pursuant to embodiments of the present disclosure, the polymer matrix is a biodegradable polymer matrix. It will be appreciated that the biodegradable polymer matrix breaks down after its intended purpose by, for example, bacterial decomposition process, to result in natural by-products, such as gases ($CO_2$, $N_2$), water, biomass, and inorganic salts.

The biodegradable polymer matrix is naturally occurring or synthetically made. Optionally, the biodegradable polymer matrix consists of functional groups, for example, ester, amide and ether. In an example, the biodegradable polymer matrix is composed of Polyhydroxyalkanoate (PHA) polymers, such as PHB, PHBV, and so forth. In an example, the biodegradable polymer matrix is composed of Polylactic acid (PLA). In another example, the biodegradable polymer matrix is composed of Polyhydroxybutyrate (PHB). Alternatively, optionally, the polymer matrix used may occur naturally. For example, the natural polymer matrix may include, but is not limited to silk, wool, cellulose and proteins.

Moreover, the reinforced biodegradable polymer nanocomposite comprises the graphene nanoplatelets or graphene-like material dispersed in the polymer matrix. The graphene nanoplatelets are typically short stacks of polygonal platelet-shaped graphene sheets in a planar (2D) structure. Due to a unique size and morphology (honeycomb pattern), graphene is the world's thinnest, strongest and stiffest material. Furthermore, graphene nanoplatelets possess enhanced barrier properties and excellent mechanical properties such as toughness, strength, and surface hardness. It will be appreciated that the graphene nanoplatelets possess a purely graphitic component of structure, therefore, the graphene nanoplatelets are excellent electrical and thermal conductors.

In an embodiment, the functionalised graphene nanoplatelets include graphene or a graphene-like material. Throughout the present disclosure, the term "graphene" refers to a honeycomb planar film formed by $sp^2$ hybridization of carbon atoms, also called graphite. Optionally, graphene may be synthesised by one of the synthesis techniques: mechanical cleaving, chemical exfoliation, chemical synthesis or chemical vapour deposition. In mechanical cleaving technique, graphite or graphene oxide is mechanically exfoliated to obtain graphene sheets. In chemical vapour deposition technique, methane and hydrogen are reacted on a metal surface at high temperatures to deposit sheets of graphene thereon. In chemical synthesis technique, graphene may be obtained by synthesizing graphene and subsequently reducing with hydrazine. Furthermore, the properties and structure of graphene may depend on the technique employed for synthesis. Beneficially, the chemical vapour deposition technique may be employed to obtain graphene sheets with the least amount of impurities.

Throughout the present disclosure, the term "graphene-like material" refers to a material or substance which may have a layered structure same or similar to graphene. The graphene-like material is selected from a group comprising functionalized graphene, doped graphene, graphene oxide, partially reduced graphene oxide, graphite flakes, molybdenum disulfide ($MoS_2$), molybdenum diselenide ($MoSe_2$), molybdenum ditelluride ($MoTe_2$), tungsten disulfide ($WS_2$), tungsten diselenide ($WSe_2$), hexagonal boron nitride (h-BN), gallium sulfide (GaS), gallium selenide (GaSe), lanthanum cuprate ($La_2CuO_4$), bismuth tritelluride ($Bi_2Te_3$), bismuth triselenide ($Bi_2Se_3$), antimony triselenide ($Sb_2Se_3$), zinc oxide (ZnO), niobium disulfide ($NbS_2$), niobium diselenide ($NbSe_2$), tantalum disulfide ($TaS_2$), vanadium disulfide ($VS_2$), rhenium disulfide ($ReS_2$), rhenium diselenide ($ReSe_2$), titanium disulfide ($TS_2$), titanium diselenide ($TSe_2$), indium trisulfide (InSs), zirconium disulfide ($ZrS_2$), zirconium diselenide ($ZrS_2$), cadmium selenide (CdSe).

In an embodiment, each of the graphene nanoplatelets or graphene-like material has a thickness in a range of 5-10 nanometres and a diameter in a range of 1-50 micrometres. In an example, the thickness may be from 5, 6, 7, 8 or 9 nanometres up to 6, 7, 8, 9 or 10 nanometres. In an example, the diameter may be from 1, 5, 10, 15, 20, 25, 30, 35, 40 or 45 micrometres up to 5, 10, 15, 20, 25, 30, 35, 40, 45 or 50 micrometres.

In an embodiment, each of the graphene nanoplatelets or graphene-like material has a thickness in a range between approximately 1 nanometre to 5 nanometres. In an embodiment, each of the graphene nanoplatelets has at least 2 graphene layers (monolayers). In an embodiment, each of the graphene nanoplatelets has a diameter in the range of approximately 0.5 micrometre to 15 micrometres. Smaller graphene nanoplatelets move or turn more easily when in a solution or when in a dispersion media, such as the polymer matrix. In particular smaller graphene nanoplatelets move or turn more easily laterally, for example, when present in a polymer matrix, and in particular polymer matrix of slightly higher viscosity than the average viscosity of commonly used polymer matrix for dispersing graphene nanoplatelets. The easier movement or the easier turning of the graphene nanoplatelets is beneficial for example when a process for forming continuous (or approximately continuous) sheet in a polymer matrix.

In an embodiment, the reinforced biodegradable polymer nanocomposite has a graphene nanoplatelets or graphene-like material content in the range 0.1% to 5% by weight, for example 1% by weight. In that example the content of the graphene nanoplatelets or graphene-like material in the reinforced biodegradable polymer nanocomposite is 1% by weight and the polymer matrix has a content of 99% by weight in the reinforced biodegradable polymer nanocomposite. It will be appreciated that the presence of the graphene nanoplatelets or graphene-like material in the polymer matrix helps the reinforced biodegradable polymer nanocomposite achieve mechanical strength and possess excellent barrier properties. Additionally, the reinforced biodegradable polymer nanocomposite with 0.5 to 5% by weight graphene nanoplatelets shows significantly improved thermal and electrical conductivity.

The graphene nanoplatelets or graphene-like material are functionalized with functional groups in a manner that planar structure of the graphene nanoplatelets or graphene-like material is retained. Notably, the 2D structure of graphene allows every atom of graphene to be available for a chemical reaction from two sides. Moreover, atoms at the edges of graphene sheet, namely edge atoms, have special chemical reactivity. Graphene may be chemically modified with oxygen- and nitrogen-containing functional groups. The term "functional group" refers to specific substituents or moieties within molecules that are responsible for specific chemical reactions associated with such molecules. Specifically, functional groups are groups of one or more atoms of distinctive chemical properties. The atoms of the functional group are linked to each other and to the rest of the molecule by covalent bonds, therefore, functional groups impart chemical characteristics to the non-polar carbon chain of the graphene molecule. Moreover, specific interactions of the functional groups affect complexation and solvation of the molecules. Thus, polar functional groups enhance the solubility of the molecules in polar solvents and non-polar functional groups enhance the solubility of the molecules in non-polar solvents. Furthermore, polar functional groups of the otherwise non-polar molecules make the entire molecule polar and therefore soluble in an aqueous environment. Moreover, the chemical reactivity of a functional group can be modified by other functional groups in the vicinity.

The term "functionalization" used throughout the present disclosure refers to the process of attaching functional groups to molecules in order to enhance the properties and characteristics of nanoplatelets, such as graphene nanoplatelets or graphene-like material, through surface modification. In this process, the graphene nanoplatelets or graphene-like material are treated with a plurality of chemicals to add functional groups at the edges of the graphene nanoplatelets or graphene-like material. Functionalized graphene nanoplatelets or graphene-like material find use in potential applications, such as fabrication of transparent conductive films, high-rate supercapacitors, biodegradable plastics, and so forth.

In an embodiment, the graphene nanoplatelets or graphene-like material are functionalized with functional groups selected from the group comprising alkyl amines, aromatic amines, functionalized amines, alkyl alcohols, other nucleophilic entities, and combinations thereof. Optionally, functional groups include alkyl amines (such as methylamine, dimethylamine, trimethylamine and most amino acids), aromatic amines (such as aniline and diphenylamine), functionalized amines, cyclic amines (such as aziridine, piperidine, N-methylpiperidine and N-phenylpiperidine), arylamines, alkylarylamines, biogenic amines, inorganic derivatives of ammonia (such as monochloramine), alkyl alcohol (such as methyl alcohol, ethyl alcohol, propyl alcohol, and so forth), nucleophilic entities (such as ammonia, anions (e.g., chlorine ion ($Cl^-$), anions of halogens ($F^-$), oxygen, sulphur, hydrogen sulphide, thiols, nitrogen, and so forth).

Furthermore, the choice of functional groups for the functionalization of graphene nanoplatelets or graphene-like material affect the dispersibility of the graphene nanoplatelets or graphene-like material in the polymer matrix. Consequently, the magnitude of dispersibility defines the mechanical strength and other properties of the resulting reinforced biodegradable polymer nanocomposite. In this regard, the polymer matrix comprises surface moieties that are substantially complementary to the functional groups of the functionalized graphene nanoplatelets or graphene-like material. In other words, the polymer matrix comprises such surface moieties which specifically interact with the functional groups of the functionalized graphene nanoplatelets or graphene-like material. For example, if the functional group of the functionalized graphene nanoplatelets or graphene-like material is an alkylamine, such as methylamine ($CH_3NH_2$), then a complementary surface moiety of the polymer matrix may be, for example, a hydroxyl group (OH) of ethylene glycol ($C_2H_6O_2$). It will be appreciated that complementary functional groups of the functionalized graphene nanoplatelets or graphene-like material and the polymer matrix result in stronger interaction between the aforesaid and thus resulting in enhanced dispersibility of the graphene nanoplatelets or graphene-like material in the polymer matrix.

In an embodiment, the polymer matrix is functionalized. The polymer matrix may be functionalized with functional groups that enhance the interaction of the polymer matrix with the functionalized graphene nanoplatelets or graphene-like material. In such case, the functionalized polymer matrix may comprise functional groups which act as promoters of interaction between the functional groups of the polymer matrix with the functional groups of the functionalized graphene nanoplatelets or graphene-like material. Optionally, functional groups of polymer matrix complementary to the functional group of the functionalized graphene nanoplatelets or graphene-like material is selected from a group comprising hydroxyl group (OH), hydrocarbons, haloalkanes, alcohols, carbonyl, ketone, ester, ether, aldehyde, carbonate, carboxylate, carboxylic acid, peroxide, hydroperoxide, acetal, amide, azides, cyanates, nitrates, nitrites, oxides, nitriles, nitroso compounds, thiols, disulfides, sulfoxides, phosphates, alkyls, branched alkyls, phenyls, aromatic and hetroaromatic compounds, and so forth.

Optionally, the dispersion media, i.e. the polymer matrix may include one of: a polar dispersion media, a non-polar dispersion media, preferable in a melted or liquid form.

More optionally, the dispersion media employed may be based on the type of the functionalized graphene nanoplatelets. In an example, the dispersion media employed may be the polar dispersion media such as water or ethanol. In such an example, the graphene nanoplatelets may include functional group of functionalized graphene nanoplatelets, wherein the functionalized graphene nanoplatelets may be polar functional group such as carboxyl or amine.

In another example, the dispersion media employed may be a non-polar solvent such as benzene or diethyl ether. In such an example, the functional group of the functionalized graphene nanoplatelets may be a non-polar functional group such as an aliphatic hydrocarbon.

Moreover, the graphene nanoplatelets or graphene-like material are dispersed in the polymer matrix using the process of dispersion. Beneficially, the graphene nanoplatelets or graphene-like material are dispersed in the polymer matrix in order to produce a uniform and fine distribution of graphite inside and on the surface of the polymer matrix. Further, dispersion of the graphene nanoplatelets or graphene-like material in the polymer matrix enhances stability, mechanical strength and optical, thermal and electrical properties of the resultant reinforced biodegradable polymer nanocomposite.

The dispersion may be facilitated by incorporating a dispersing medium with the graphene nanoplatelets or graphene-like material and the polymer matrix. The dispersion medium is a synthetic, polymeric and viscous compound that provides external and continuous phase of dispersion for the graphene nanoplatelets or graphene-like material in the polymer matrix. The dispersion media may be liquids, solids, and so forth. Liquid dispersion media may be solvents, mixtures of solvents, any other substance, composition, compound, and so forth, which exhibits liquid properties at room or elevated temperatures. Examples of liquid dispersion media may include, but are not limited to polyethylene glycol ether, castor oil, vegetable wax and water. Solid dispersion media may be at least one of: polymers (such as a solid or melted polymer, namely polymer melt), glasses, metals, metal oxides and so forth.

Optionally, an ultrasonication method may be used to disperse the graphene nanoplatelets or graphene-like material in the polymer matrix. In the ultrasonication method, ultrasound energy is applied to agitate the graphene nanoplatelets and polymer matrix in the dispersing medium. when ultrasound propagates via a series of compression, attenuated waves are induced in the molecules of the dispersing medium. Such shock waves promote the 'peeling off' of the outer part of the graphene nanoplatelets and thus produce the separation of individualized graphene nanoplatelet. The ultrasonication method is an effective method to disperse and exfoliate graphene and obtain stable suspensions in various dispersing medium with low viscosity, such as water, acetone and ethanol. It should be noted that both of frequency of ultrasound (most commonly used zone: 10-50 kHz) and treatment time are crucial parameters for the integrity of graphene structure and its dispersion state in polymer.

Optionally, a calendering method (for example, three-roll mill method) may be used to disperse the graphene nanoplatelets in the polymer matrix. In the three-roll mill method, shear force is employed by rollers to disperse the graphene nanoplatelets in the polymer matrix. For instance, three-roll mill consists of three adjacent cylindrical rolls where three rolls turned at the different angular velocity ratio. The first and third rolls rotated in the same direction while the centre roll rotated oppositely. Adjusting the gap distance and nip force between rolls resulted in high shearing stress, which could break up the nanoplatelet agglomerates and hence generate highly dispersed polymer dispersion, the dispersion state of the graphite nanoplatelets may be tuned by changing the gap between the adjacent rolls. A serial of polymer composites with low loading of reduced graphite oxide (RGO) sheets have been prepared by using the calendering process.

Optionally, an extrusion method may be used to disperse graphene into solid polymers like most thermoplastics. Twin screws in extruder hopper rotate at a high speed generating high shear flow through adjusting various parameters such as screw speed, temperature and time that leads to graphene dispersing and mixed with polymer matrix. The extrusion method meets large-scale production of polymer composites, which has been used for fabricating high-performance graphene-polymer composites.

In an embodiment, the graphene nanoplatelets comprise functionable oxygen groups in a range of 0 to 10 percent by weight, wherein the graphene nanoplatelets are functionalised using the functionable oxygen groups. The graphene nanoplatelets comprising a very low amount of functionable oxygen groups is selected. Optionally, the graphene nanoplatelet is graphene oxide. More optionally, the graphene oxide comprises single structural sheets oxidised or functionalized on both sides of the sheet. Furthermore, optionally, the graphene oxide comprises edge oxidization or functionalization of the sheet. It will be appreciated that the functionable oxygen groups are the sites for the functional groups to bind to and from functionalized graphene nanoplatelets. For example, graphene oxide could be non-covalently functionalised by mixing graphene with organic molecules such as polymers. In an example, a water solution processing method can be used for the preparation of polyvinyl alcohol (PVA) and nanocomposites with graphene oxide (GO).

Optionally, each of the carbon atoms in the graphene oxide comprises a delocalised electron. Consequently, a functional group may react with the carbon atoms thereof. More optionally, the functionalised graphene includes at least one of a functional group: aliphatic ester, aromatic ester, amine, epoxide, carboxyl, hydroxyl, siloxanes, silanes. In addition, the functional groups of the functionalized graphene may influence the properties thereof. Furthermore, the functional groups of the functionalized graphene oxide may enhance thermal conductivity, when exposed to high temperature in comparison with the synthesized graphene solely comprising carbon atoms.

In an embodiment, the graphene nanoplatelets or graphene-like material are edge functionalized. The graphene nanoplatelets or graphene-like material comprise functionable oxygen atoms at the edges due to aforesaid techniques of producing graphene nanoplatelets, i.e. the graphene oxide flakes. The said process attaches oxygen atoms only at the edges of the graphene, thereby making these oxygen atoms as functionable sites for the attachment of functional groups during functionalization of graphene nanoplatelets. Such functionalization of the graphene nanoplatelets, referred to as the edge functionalization, enhance stronger interactions between the polymer matrix and the functionalized graphene nanoplatelets dispersed therein. Furthermore, the edge functionalization enhances mechanical properties combined with thermal conductivity, when exposed to high temperature in comparison with the synthesized graphene solely comprising carbon atoms.

Optionally, regarding the method disclosed herein, the graphene nanoplatelets or graphene-like material comprising low functionable oxygen atoms may be treated chemically in order to be used in the reinforced biodegradable polymer nanocomposite. Notably, the chemical treatment provides additional mechanical strength and barrier properties to the graphene nanoplatelets or graphene-like material. Moreover, the chemical treatment strengthens the interface and load transfer at sandwich-like polymer matrix of the reinforced biodegradable polymer nanocomposite. Specifically, the chemical treatment comprises treating the virgin graphene nanoplatelets or graphene-like material with functional groups, in a manner that planar structure of the graphene nanoplatelets or graphene-like material is retained, for the pre-determined time period and the pre-determined temperature. Optionally, the predetermined time period is 10 to 20 hours, preferably 15 hours. More optionally, the pre-determined temperature is 45 to 75° C., preferably 60° C. It will be appreciated that the virgin graphene nanoplatelets or graphene-like material refer to the graphene nanoplatelets or graphene-like material in a raw form.

Optionally, the chemical treatment process comprises a step of activating the graphene nanoplatelets or graphene-like material, comprising low functionable oxygen atoms, with an activating agent. The term "activating agent" refers to a composition, compound or substance which promotes the dispersion of solid the graphene nanoplatelets or graphene-like material in the dispersion media, i.e. the polymer matrix. Suitable activating agents may be selected from a group comprising thionyl chloride, Benzotriazol-1-yloxytris[dimethylamino]phosphonium hexafluorophosphate (BOP), 3-diethyoxyphosphoryloxy-1,2,3-benzotriazin-4 (3H)-one (DEPBT), N,N'-Dicyclohexylcarbodiimide, N,N'-Diisopropylcarbodiimide, 4-(4,6-dimethoxy-1,3,5-triazin-2-yl)-4-methylmorpholinium chloride (DMTMM), 1-[bis(dimethylamino)methylene]-1H-1,2,3-triazolo[4,5-b]pyridinium-3-oxide (HATU), 2-(1H-benzotriazol-1-yl)-1,1,3,3-tetramethyluronium hexafluorophosphate (HBTU), 1H-(6-chlorobenzotriazol-1-yl)-1,1,3,3-tetramethyluronium hexafluorophosphate (HCTU), 1-Hydroxy-7-azabenzotriazole, Hydroxybenzotriazole, (7-azabenzotriazol-1-yloxy)tripyrrolidinophosphonium hexafluorophosphate (PyAOP) reagent, (benzotriazol-1-yloxy)tripyrrolidinophosphonium hexafluorophosphate (PyBOP) and Thiocarbonyldiimidazole, and the like.

Furthermore, optionally, the chemical treatment process comprises a step of functionalizing the activated graphene nanoplatelets or graphene-like material with a nucleophilic agent (or nucleophile). The term "nucleophilic agent" refers to a composition, compound or substance that donates an electron pair to form a chemical bond in a reaction. Suitable activating agents may be selected from a group comprising alkyl amine, aromatic amines, functionalized amines, alkyl alcohols or other nucleophilic entities.

Furthermore, optionally, the chemical treatment process comprises a step of filtering the treated virgin graphene nanoplatelets or graphene-like material. The treated virgin graphene nanoplatelets or graphene-like material are filtered and washed with cold water followed by propan-2-ol several times (for example, twice) to remove by-products of the chemical treatment of the virgin graphene nanoplatelets or graphene-like material. In an alternative embodiment, the treated virgin graphene nanoplatelets or graphene-like material are filtered and centrifuged with water followed by propan-2-ol twice to remove by-products of the chemical treatment. Optionally, the filtered and washed (or centrifuged) virgin graphene nanoplatelets or graphene-like material are then dried in an oven at a temperature of 45 to 75° C., preferably 60° C., under standard pressure conditions or under vacuum. It will be appreciated that vacuum condition may be any range of a negative pressure depending on the vacuum equipment, such as high strength/precision vacuum pumps, vacuum oven, and the like.

Moreover, the method comprises dispersing functionalized graphene nanoplatelets or graphene-like material in the polymer matrix to form the reinforced biodegradable polymer nanocomposite. The polymer matrix, preferably in a liquid form is spread over a platform, for example, a glass substrate. The graphene nanoplatelets or graphene-like material, are dispersed in the polymer matrix spread over the platform. Subsequently, the aforementioned dispersion of the graphene nanoplatelets or graphene-like material is iterated to obtain multiple layers of polymer matrix sandwiched between graphene nanoplatelets or graphene-like material. In this case, the graphene nanoplatelets or graphene-like material are dispersed by continuous stirring of the melted polymer matrix after the addition of the graphene nanoplatelets or graphene-like material.

The dispersed graphene nanoplatelets or graphene-like material are allowed to interact with the polymer matrix for a predefined time duration at predefined temperature. Optionally, interaction of the graphene nanoplatelets or graphene-like material with the polymer matrix may be ensured by stirring for a predefined time duration ranging from 5 minutes to a few hours, preferably 1 hour, at room temperature. Optionally, the resultant reinforced biodegradable polymer nanocomposite is then filtered and washed. Notably, the graphene nanoplatelets or graphene-like material strengthen the interface and load transfer, thereby providing additional mechanical strength to the reinforced biodegradable polymer nanocomposite.

Optionally, the glass substrate is a polytetrafluoroethylene (PTFE) film on top of a glass. PTFE film is extremely durable and provides strength to the glass and prevents it from chemical damaging and/or cracking or breaking. Moreover, PTFE has a very low coefficient of friction, therefore resists solids to stick on it. Furthermore, PTFE is hydrophobic and thus provides high resistance to moisture or flowing liquids. Alternatively, the glass substrate may be a silicone-coated glass substrate, a PTFE glass mesh, a PEEK-coated glass substrate, and the like. Alternatively, optionally, the platform may be a PTFE-coated carbon material, a PTFE-coated graphite material, a PTFE-coated bronze material, a PTFE-coated metal, an all-metal design, such as stainless steel, and so forth.

Optionally, the graphene nanoplatelets or graphene-like material are polarically aligned in the polymer matrix in the reinforced biodegradable polymer nanocomposite. The aforementioned method of manufacture of reinforced biodegradable polymer nanocomposite comprises interaction of functional groups of the polymer matrix with the functional groups of the graphene nanoplatelets or graphene-like material dispersed in the polymer matrix. Notably, the graphene nanoplatelets or graphene-like material are polarically aligned using polar or non-polar interactions between the functional groups of the polymer matrix and the graphene nanoplatelets or graphene-like material dispersed therein. The stronger binding between the polymer matrix and the graphene nanoplatelets or graphene-like material dispersed therein facilitate the improved barrier properties and the conductivity (both electrical and thermal) in the resultant reinforced biodegradable polymer nanocomposite.

Optionally, the reinforced biodegradable polymer nanocomposite is further dispersed in at least one solvent, wherein a solvent is at least one of: a plasticizer, a stabilizer, a filler, an impact modifier. In this regard, plasticizer refers to a solvent that acts as an agent which, for example, softens, makes more flexible, malleable, pliable, and plastic, the reinforced biodegradable polymer nanocomposite. The plasticizer provides flexibility, pliability, and durability that further decreases melting temperature and glass transition temperature of the reinforced biodegradable polymer nanocomposite. Examples of plasticizer include, but are not limited to, tributyl citrate, acetyl tributyl citrate, diethyl phthalate, glycerol triacetate, glycerol tripropionate, triethyl citrate, acetyl triethyl citrate, phosphate esters (for example, triphenyl phosphate, resorcinol bis(diphenyl phosphate), and oligomeric phosphate), long-chain fatty acid esters, aromatic sulfonamides, hydrocarbon processing oil, propylene glycol, epoxy-functionalized propylene glycol, polyethylene glycol, polypropylene glycol, partial fatty acid ester (for example, Glycerol monostearate (GMS), Loxiol GMS 95), glucose monoester (Dehydrat VPA 1726), epoxidized soybean oil, acetylated coconut oil, linseed oil, and epoxidized linseed oil. Moreover, optionally, a filler is additive which may alter mechanical properties, physical properties and/or chemical properties of the reinforced biodegradable polymer nanocomposite. Examples of filler include, but are not limited to, magnesium oxide, hydrous magnesium silicate, aluminium oxides, silicon oxides, titanium oxides, calcium carbonate, clay, chalk, boron nitride, limestone, diatomaceous earth, mica, glass quartz, ceramic and/or glass microbeads, metal or metal oxide fibres and particles, Magnetite®, Magnetic Iron(III) oxide, carbon nanotubes and fibres.

Additionally, optionally, a stabilizer is at least one of: a thermal stabilizer, an oxidative stabilizer, light stabilizer. Typically, thermal stabilizer when added to the reinforced biodegradable polymer nanocomposite improves resistance to heat thereof, thereby enabling the reinforced biodegradable polymer nanocomposite to sustain its properties at higher temperatures. In an example, the thermal stabilizer is hydrogen chloride scavenger (such as epoxidized soybean oil). Moreover, oxidative stabilizer when added to the reinforced biodegradable polymer nanocomposite improves resistance of the reinforced biodegradable polymer nanocomposite to oxidative damages due to oxidation by atmospheric air, corrosive or other reactive chemicals (for example, acids, peroxides, hypo chlorides, and ozone). Optionally, the oxidative stabilizer used is at least one of: alkoxy substituted hindered amine light stabilizers (HALS) (for example, N—O—R HALS), N-(1,3-dimethylbutyl)-N'-phenyl-p-phenylenediannine (6PPP), N-isopropyl-N-phenyl-phenylenediamine (IPPD), 6-ethoxy-2,2,4-trimethyl-1,2-dihydroquinoline (ETMQ), ethylene diurea (EDU), and paraffin wax. Furthermore, light stabilizer when added to the reinforced biodegradable polymer nanocomposite improves resistance of the reinforced biodegradable polymer nanocomposite to damage from exposure to natural or artificial light in a wide spectral range (for example, from deep UV to mid-IR). Examples of light stabilizer include ultraviolet (UV) light stabilizers and hindered amine light stabilizers (HALS or HAS).

Furthermore, optionally, impact modifier increases resistance of the reinforced biodegradable polymer nanocomposite against breaking, under impact conditions. Examples of impact modifier include, but are not limited to, polymers or copolymers of an olefin (for example, ethylene, propylene, a combination of ethylene and propylene with various (meth)acrylate monomers and/or various maleic-based monomers), alkyl(methyl)acrylates (for example, butyl acrylate, hexyl acrylate, propyl acrylate, or a combination thereof), alkyl(meth)acrylate monomer with acrylic acid (for example, maleic anhydride, glycidyl methacrylate, or a combination thereof), monomers providing additional moieties (for example, carboxylic acid, anhydride, epoxy), block copolymers (for example, A-B diblock copolymers, A-B-A triblock copolymers, and rubber block, B, derived from isoprene, butadiene or isoprene and butadiene).

Optionally, a synthetic barrier film is manufactured using the reinforced biodegradable polymer nanocomposite or obtained by performing the method of manufacturing the reinforced biodegradable polymer nanocomposite. The term "synthetic barrier film" as used herein refers to a polymeric layer comprising the reinforced biodegradable polymer nanocomposite. The synthetic barrier film exhibits improved mechanical properties, and water and oxygen barrier properties. Furthermore, the synthetic barrier film is obtained by performing the method of manufacturing the reinforced biodegradable polymer nanocomposite (as described in detail hereinabove). Optionally, the synthetic barrier film is manufactured from the reinforced biodegradable polymer nanocomposite using an electrically-assisted three-dimensional (3D) printing process. The electrically-assisted 3D printing process takes place in a tank, such as a glass tank. The polymer matrix in a liquid form is filled and spread over the glass tank. The graphene nanoplatelets or graphene-like material are dispersed in the polymer matrix. The graphene nanoplatelets or graphene-like material dispersed in the polymer matrix are subjected to an electric current, for example, a direct-current voltage of 1300 V, to generate the electric field of 433 V/cm in order to polarically align the graphene nanoplatelets or graphene-like material in the polymer matrix. More optionally, the graphene nanoplatelets or graphene-like material polarically aligned in the polymer matrix are subjected to light, such as ultraviolet light, to initiate the process of photocuring repeatedly to cure layers of the reinforced biodegradable polymer nanocomposite and to obtain the synthetic barrier film. Optionally, an intensity of the light emitted from the light source may be 3.16 milliwatts centimetre$^{-2}$ (mW/cm$^2$). Optionally, an optical microelectromechanical system (MEMS) of Digital Micromirror Device (DMD) light projection system, forming core of a trademarked DLP projection technology of Texas Instruments, may be used. Alternatively, a range of digital light processing systems may be used for photocuring. Alternatively, optionally, lasers may be used for photocuring.

Moreover, the synthetic barrier film may be used for various applications such as packaging materials, biomedical industries, construction and so forth. The packaging materials, such as sachets, pouches, bottles, containers and so forth manufactured using the synthetic barrier film possess mechanical strength and high barrier properties, and therefore provides protection to content, such as a liquid, a food item and the like, stored therein. Moreover, the packaging materials manufactured using the synthetic barrier film has excellent mechanical properties. Therefore, the packaging material may be manufactured with less quantity of synthetic barrier film, thereby reducing the overall plastic content as well as thickness thereof.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A reinforced biodegradable polymer nanocomposite comprising:
    a polymer matrix; and
    functionalized graphene nanoplatelets with nitrogen-containing functional groups attached at edge sites of the functionalized graphene nanoplatelets,
        wherein the edge sites of the functionalized graphene nanoplatelets are activated by an activating agent,
        wherein the activating agent is selected to promote a dispersion of the functionalized graphene nanoplatelets in the polymer matrix to form a reinforced biodegradable polymer nanocomposite, and
        wherein the polymer matrix comprises functional groups, wherein the functional groups of the polymer matrix are selected from a group consisting of esters, amides, and ethers,
        wherein the functional groups of the polymer matrix are configured to interact with the functional groups attached at the edge sites of the functionalized graphene nanoplatelets to strengthen the interaction of the polymer matrix with the functionalized graphene nanoplatelets.

2. The reinforced biodegradable polymer nanocomposite of claim 1, wherein the activating agent is selected from the group consisting of: thionyl chloride, Benzotriazol-1-yloxy-tris[dimethylamino]phosphonium hexafluorophosphate (BOP), 3-(DEPBT), diethyoxyphosphoryloxy-1,2,3-benzotriazin-4 (3H)-one N,N'-Dicyclohexylcarbodiimide, N,N'-Diisopropylcarbodiimide, 4-(4,6-dimethoxy-1,3,5-triazin-2-yl)-4-methylmorpholinium chloride (DMTMM), 1-[bis(dimethylamino)methylene]-1H-1,2,3-triazolo[4,5-b]pyridinium-3-oxide (HATU), 2-(1H-benzotriazol-1-yl)-1,1,3,3-tetramethyluronium hexafluorophosphate (HBTU), 1H-(6-chlorobenzotriazol-1-yl)-1,1,3,3-tetramethyluronium hexafluorophosphate (HCTU), 1-Hydroxy-7-azabenzotriazole, Hydroxybenzotriazole, (7-azabenzotriazol-1-yloxy)tripyrrolidinophosphonium hexafluorophosphate (PyAOP) reagent, (benzotriazol-1-yloxy)tripyrrolidinophosphonium hexafluorophosphate (PyBOP) and Thiocarbonyldiimidazole.

3. The reinforced biodegradable polymer nanocomposite of claim 1, wherein the functional groups attached at the edges of sheets of the functionalized graphene nanoplatelets are selected from the group consisting of alkyl amines, aromatic amines, functionalized amines, and combinations thereof.

4. The reinforced biodegradable polymer nanocomposite of claim 1, wherein the polymer matrix comprises styrenic, acrylic or vinylic polymer.

* * * * *